(12) United States Patent
Lorenz et al.

(10) Patent No.: US 9,139,691 B2
(45) Date of Patent: Sep. 22, 2015

(54) PROCESS FOR PREPARING HIGH MOLECULAR WEIGHT POLYETHER POLYOLS

(75) Inventors: Klaus Lorenz, Dormagen (DE); Jörg Hofmann, Krefeld (DE); Horst Zwick, Dormagen (DE); Christian Steinlein, Ratingen (DE); Edward Browne, Köln (DE)

(73) Assignee: BAYER INTELLECTUAL PROPERTY GMBH, Monheim (DE)

( * ) Notice: Subject to any disclaimer, the term of this patent is extended or adjusted under 35 U.S.C. 154(b) by 0 days.

(21) Appl. No.: 14/125,776

(22) PCT Filed: Jun. 26, 2012

(86) PCT No.: PCT/EP2012/062363
§ 371 (c)(1),
(2), (4) Date: Feb. 6, 2014

(87) PCT Pub. No.: WO2013/000915
PCT Pub. Date: Jan. 3, 2013

(65) Prior Publication Data
US 2014/0142344 A1 May 22, 2014

(30) Foreign Application Priority Data
Jun. 30, 2011 (EP) .................................. 11172174

(51) Int. Cl.
C08G 65/26 (2006.01)
(52) U.S. Cl.
CPC ........ *C08G 65/2609* (2013.01); *C08G 65/2663* (2013.01); *C08G 65/2696* (2013.01)
(58) Field of Classification Search
CPC ................................................ C08G 65/2609
See application file for complete search history.

(56) References Cited

U.S. PATENT DOCUMENTS

| 5,096,993 A | 3/1992 | Smith et al. |
| 5,470,813 A | 11/1995 | Le-Khac |
| 5,714,639 A | 2/1998 | Bowman et al. |
| 7,008,900 B1 | 3/2006 | Hofmann et al. |
| 2005/0272912 A1* | 12/2005 | Eleveld et al. ................ 528/425 |

FOREIGN PATENT DOCUMENTS

| DE | 4117679 | 12/1991 |
| EP | 0425694 | 5/1991 |
| EP | 0700949 | 3/1996 |
| EP | 0732561 | 9/1996 |
| EP | 0743093 | 11/1996 |
| EP | 0761708 | 3/1997 |
| EP | 1316573 | 6/2003 |
| WO | 91/04997 | 4/1991 |
| WO | 97/40086 | 10/1997 |
| WO | 98/16310 | 4/1998 |
| WO | 99/14258 | 3/1999 |
| WO | 00/47649 | 8/2000 |
| WO | 01/38420 | 5/2001 |

OTHER PUBLICATIONS

Goethal, Telechelic Polymers:synthesis and application, 1989 CRC Press, Inc., p. 201.*
International Search Report for PCT/EP2012/062363 Mailed Aug. 30, 2012.

* cited by examiner

*Primary Examiner* — Yong Chu
*Assistant Examiner* — Ana Z Muresan
(74) *Attorney, Agent, or Firm* — Miles & Stockbridge P.C.

(57) ABSTRACT

The invention relates to a process for the preparation of polyether polyols with equivalent molecular weights of from 8,000 to 20,000 g/mol from one or more H-functional starter compounds and one or more alkylene oxides in the presence of a double metal cyanide catalyst, characterized in that the alkylene oxides are metered into the reactor in the course of from 15 to 23 h.

20 Claims, No Drawings

PROCESS FOR PREPARING HIGH MOLECULAR WEIGHT POLYETHER POLYOLS

CROSS REFERENCE TO RELATED APPLICATIONS

This application is a §371 National Stage Application of PCT/EP2012/062363, filed Jun. 26, 2012, which claims priority to European Application No. 11172174.2, filed Jun. 30, 2011.

BACKGROUND OF THE INVENTION

1. Field of the Invention

The present invention provides a process for the preparation of polyether polyols with equivalent molecular weights of from 8,000 to 20,000 g/mol, preferably from 9,000 to 20,000 g/mol, particularly preferably from 10,000 to 16,000 g/mol.

2. Description of Related Art

Polyether polyols which are suitable for the preparation of polyurethanes can be obtained via various preparation processes. The base-catalysed addition of alkylene oxides on to H-functional starter compounds on the one hand and the use of double metal cyanide compounds as catalysts ("DMC catalysts") for the addition of alkylene oxides on to H-functional starter compounds on the other hand are of large-scale industrial importance. The addition of alkylene oxides on to suitable starter compounds catalysed by (Lewis) acids is of minor importance.

Under alkali metal hydroxide catalysis, undesirable side reactions increase significantly with increasing molecular weight of the polymer. There is to be mentioned here in particular the isomerization of propylene oxide to allyl alcohol, which at high equivalent molecular weights (or low OH numbers) leads to a high content of monofunctional polyether species in the reaction mixture and therefore to a significant lowering of the functionality. The monofunctional polyether molecules therefore have an adverse effect on the full curing properties and the profile of physical properties of polyurethane systems and other materials which can be prepared from these polyethers, such as, for example, silane-based sealants.

By the use of DMC catalysts it has become possible to speed up the addition of alkylene oxides, in particular propylene oxide, on to H-functional starter compounds down to very low OH numbers, i.e. high equivalent molecular weights, without the abovementioned isomerization of propylene oxide to allyl alcohol occurring to a noticeable extent. Highly active DMC catalysts, which are described, e.g. in U.S. Pat. No. 5,470,813, EP-A 700949, EP-A 743093, EP-A 761708, WO-A 97/40086, WO-A 98/16310 and WO-A 00/47649, furthermore have an exceptionally high activity and render possible polyether polyol preparation at very low catalyst concentrations (100 ppm or less), so that it is no longer necessary to separate off the catalyst from the finished product. The highly active DMC catalysts described in EP-A 700949, which, in addition to a double metal cyanide compound (e.g. zinc hexacyanocobaltate(III)) and an organic complexing ligand (e.g. tert-butanol), also contain a polyether with a number-average molecular weight of greater than 500 g/mol, are a typical example.

The equivalent molecular weight of materials containing active hydrogen atoms is to be understood as meaning the total weight of the material containing active hydrogen atoms divided by the number of active hydrogen atoms. In the case of materials containing hydroxyl groups (such as, for example, polyether polyols), it is related to the OH number (hydroxyl number) as follows:

$$\text{Equivalent molecular weight} = 56{,}100/(\text{OH number [mg of KOH/]}) \tag{I}$$

The equivalent molecular weight of the polyether polyol is thus determined according to formula (I), the hydroxyl number of the polyether polyol being determined in accordance with DIN 53240.

The DMC-catalysed preparation of alkylene oxide addition products with high equivalent molecular weights and the use thereof for the preparation of polyurethane- or polyurea-based materials are known to the person skilled in the art. For example, DE-A 4117679 and U.S. Pat. No. 5,096,993 disclose the use of polyhydroxy and polyamine compounds with molecular weights of up to 30,000 Da for the preparation of flexible polyurethane or polyurea elastomers by the reaction injection moulding process ("RIM" technology). WO-A 9104997 discloses polyether triols with molecular weights of up to 30,000 Da as the polyether component of isocyanate-terminated prepolymers which are employed in high performance polyurethane sealant systems. EP-A 1316573 discloses a process for obtaining flexible foam bodies with good long-term use properties which can be rapidly removed from the mould, for the preparation of which polyether polyols prepared via DMC catalysis with equivalent molecular weights of from preferably 5,000 to 11,000 Da are employed as the polyol component. EP-A 0425694 discloses isocyanate-terminated polyether prepolymers, the polyether component of which has equivalent molecular weights of up to 15,000 Da. Such polyether polyols are obtained via DMC catalysis. Polyethers prepared via DMC catalysis with equivalent molecular weights of up to 15,000 Da are used in EP-A 0732561 as starting compounds for the preparation of moisture-curing sealant systems based on polymers containing silane groups.

In the DMC-catalysed preparation of polyether polyols with very high equivalent molecular weights (8,000 Da or higher), achieving narrow molecular weight distributions and, associated with this, manageable viscosities presents increasing problems as the equivalent weight increases. The processes of the prior art offer no solutions to this problem.

SUMMARY

The object of the present invention was therefore to provide a preparation process for polyether polyols with equivalent molecular weights of from 8,000 to 20,000 g/mol, preferably from 9,000 to 20,000 g/mol, particularly preferably from 10,000 to 16,000 g/mol, which is optimized for achieving the lowest possible viscosities and the narrowest possible molecular weight distributions.

It has been found, surprisingly, that a process for the preparation of polyether polyols with equivalent molecular weights of from 8,000 to 20,000 g/mol, preferably from 9,000 to 20,000 g/mol, particularly preferably from 10,000 to 16,000 g/mol, from one or more H-functional starter compounds and one or more alkylene oxides in the presence of a double metal cyanide catalyst, characterized in that the alkylene oxides are metered into the reactor over a period of from 15 to 23 h, achieves the abovementioned object according to the invention.

DETAILED DESCRIPTION OF A PREFERRED EMBODIMENT

H-functional starter compounds are those compounds which contain at least one Zerewitinoff-active hydrogen atom, sometimes also merely called "active hydrogen". A hydrogen bonded to C, N, O or S is called Zerewitinoff-active hydrogen if it delivers methane by reaction with methylmagnesium iodide by a method discovered by Zerewitinoff. Typical examples of compounds with Zerewitinoff-active hydrogen are compounds which contain carboxyl, hydroxyl or thiol groups as functional groups. Functionality is understood as meaning the number of Zerewitinoff-active hydrogen atoms per molecule of the H-functional starter compounds. Suitable H-functional starter compounds usually have functionalities of from 1 to 35, preferably from 1 to 8, particularly preferably 2 to 3. Their molecular weights are from 18 g/mol to 1,200 g/mol. If a mixture of H-functional starter compounds is employed, the functionality of this mixture is the number-average functionality of the H-functional starter compounds. Typical examples of suitable starter compounds are methanol, ethanol, 1-propanol, 2-propanol and higher aliphatic mono-ols, in particular fatty alcohols, phenol, alkyl-substituted phenols, propylene glycol, ethylene glycol, diethylene glycol, dipropylene glycol, 1,2-butanediol, 1,3-butanediol, 1,4-butanediol, hexanediol, pentanediol, 3-methyl-1,5-pentanediol, 1,12-dodecanediol, glycerol, trimethylolpropane, pentaerythritol, sorbitol, sucrose, hydroquinone, pyrocatechol, resorcinol, bisphenol F, bisphenol A, 1,3,5-trihydroxybenzene, and condensates of formaldehyde and phenol or urea containing methylol groups. Highly functional starter compounds based on hydrogenated starch hydrolysis products can also be employed. Such compounds are described, for example, in EP-A 1525244. Ring-opening products from cyclic carboxylic acid anhydrides and polyols can moreover also be employed as starter compounds. Examples are ring-opening products of phthalic anhydride, succinic anhydride, maleic anhydride on the one hand and ethylene glycol, diethylene glycol, 1,2-butanediol, 1,3-butanediol, 1,4-butanediol, hexanediol, pentanediol, 3-methyl-1,5-pentanediol, 1,12-dodecanediol, glycerol, trimethylolpropane, pentaerythritol or sorbitol on the other hand. In addition, it is also possible to employ mono- or polyfunctional carboxylic acids directly as starter compounds.

In the process according to the invention, previously prepared alkylene oxide addition products of the H-functional starter compounds mentioned, that is to say polyether polyols preferably with OH number of from 16 to 1,000 mg of KOH/g, particularly preferably 40 to 1,000 mg of KOH/g, can also be employed as exclusive starters for the process according to the invention or added to the abovementioned starters. These alkylene oxide addition products which can be employed as (co)starters can in their turn be prepared via DMC or base catalysis. It is also possible here to employ polyester polyols preferably with OH numbers in the range of from 20 to 800 mg of KOH/g as (co)starters in the process according to the invention, with the aim of polyether ester preparation. Polyester polyols which are suitable for this can be prepared, for example, by known processes from organic dicarboxylic acids having 2 to 12 carbon atoms and polyfunctional alcohols, preferably diols, having 2 to 12 carbon atoms, preferably 2 to 6 carbon atoms.

Polycarbonate polyols, polyester carbonate polyols or polyether carbonate polyols, preferably polycarbonate diols, polyester carbonate diols or polyether carbonate diols, preferably in each case with OH numbers in the range of from 20 to 800 mg of KOH/g, can furthermore be used as (co)starters as H-functional starter substances. These are prepared, for example, by reaction of phosgene, dimethyl carbonate, diethyl carbonate or diphenyl carbonate with difunctional or more than difunctional alcohols or polyester polyols or polyether polyols.

In the process according to the invention, H-functional starter compounds with hydroxyl groups, such as, for example, methanol, ethanol, 1-propanol, 2-propanol and higher aliphatic mono-ols, in particular fatty alcohols, phenol, alkyl-substituted phenols, propylene glycol, ethylene glycol, diethylene glycol, dipropylene glycol, 1,2-butanediol, 1,3-butanediol, 1,4-butanediol, hexanediol, pentanediol, 3-methyl-1,5-pentanediol, 1,12-dodecanediol, glycerol, trimethylolpropane, pentaerythritol, sorbitol, sucrose, hydroquinone, pyrocatechol, resorcinol, bisphenol F, bisphenol A, 1,3,5-trihydroxybenzene, condensates of formaldehyde and phenol containing methylol groups and hydrogenated starch hydrolysis products, as well as the alkylene oxide addition products of these starter compounds preferably serve as carriers of the active hydrogens. Mixtures of various H-functional starter compounds can also be employed. The functionality of the H-functional starter compounds is particularly preferably 2 to 3.

DMC catalysts which are suitable for the process according to the invention are known in principle from the prior art (see e.g. U.S. Pat. Nos. 3,404,109, 3,829,505, 3,941,849 and 5,158,922). DMC catalysts, which are described e.g. in U.S. Pat. No. 5,470,813, EP-A 700949, EP-A 743093, EP-A 761708, WO 97/40086, WO 98/16310 and WO 00/47649, have a very high activity in the polymerization of alkylene oxides and render possible the preparation of polyether polyols under optimum conditions at very low catalyst concentrations (100 ppm or less), so that in general it is no longer necessary to separate off the catalyst from the finished product. The highly active DMC catalysts described in EP-A 700949, which, in addition to a double metal cyanide compound (e.g. zinc hexacyanocobaltate(III)) and an organic complexing ligand (e.g. tert-butanol), also contain a polyether with a number-average molecular weight of greater than 500 g/mol, are a typical example. It is also possible to employ the alkaline DMC catalysts disclosed in EP application no. 10163170.3.

Cyanide-free metal salts which are suitable for the preparation of the double metal cyanide compounds preferably have the general formula (II)

$$M(X)_n \qquad (II)$$

wherein

M is chosen from the metal cations $Zn^{2+}$, $Fe^{2+}$, $Ni^{2+}$, $Mn^{2+}$, $Co^{2+}$, $Sr^{2+}$, $Sn^{2+}$, $Pb^{2+}$ and $Cu^{2+}$, preferably M is $Zn^{2+}$, $Fe^{2+}$, $Co^{2+}$ or $Ni^{2+}$, X are one or more (i.e. different) anions, preferably an anion chosen from the group of halides (i.e. fluoride, chloride, bromide, iodide), hydroxide, sulfate, carbonate, cyanate, thiocyanate, isocyanate, isothiocyanate, carboxylate, oxalate and nitrate;

n is 1 if X=sulfate, carbonate or oxalate and n is 2 if X=halide, hydroxide, cyanate, thiocyanate, isocyanate, isothiocyanate or nitrate, or suitable cyanide-free metal salts have the general formula (III)

$$M_r(X)_3 \qquad (III)$$

wherein

M is chosen from the metal cations $Fe^{3+}$, $Al^{3+}$ and $Cr^{3+}$,

X are one or more (i.e. different) anions, preferably an anion chosen from the group of halides (i.e. fluoride, chloride, bromide, iodide), hydroxide, sulfate, carbonate, cyanate, thiocyanate, isocyanate, isothiocyanate, carboxylate, oxalate and nitrate;

r is 2 if X=sulfate, carbonate or oxalate and r is 1 if X=halide, hydroxide, cyanate, thiocyanate, isocyanate, isothiocyanate, carboxylate or nitrate, or suitable cyanide-free metal salts have the general formula (IV)

$$M(X)_s \quad (IV)$$

wherein
M is chosen from the metal cations $Mo^{4+}$, $V^{4+}$ and $W^{4+}$
X are one or more (i.e. different) anions, preferably an anion chosen from the group of halides (i.e. fluoride, chloride, bromide, iodide), hydroxide, sulfate, carbonate, cyanate, thiocyanate, isocyanate, isothiocyanate, carboxylate, oxalate and nitrate;
s is 2 if X=sulfate, carbonate or oxalate and
s is 4 if X=halide, hydroxide, cyanate, thiocyanate, isocyanate, isothiocyanate, carboxylate or nitrate,
or suitable cyanide-free metal salts have the general formula (V)

$$M(X)_t \quad (V)$$

wherein
M is chosen from the metal cations $Mo^{6+}$ and $W^{6+}$
X are one or more (i.e. different) anions, preferably an anion chosen from the group of halides (i.e. fluoride, chloride, bromide, iodide), hydroxide, sulfate, carbonate, cyanate, thiocyanate, isocyanate, isothiocyanate, carboxylate, oxalate and nitrate;
t is 3 if X=sulfate, carbonate or oxalate and
t is 6 if X=halide, hydroxide, cyanate, thiocyanate, isocyanate, isothiocyanate, carboxylate or nitrate.

Examples of suitable cyanide-free metal salts are zinc chloride, zinc bromide, zinc iodide, zinc acetate, zinc acetylacetonate, zinc benzoate, zinc nitrate, iron(II) sulfate, iron (II) bromide, iron(II) chloride, cobalt(II) chloride, cobalt(II) thiocyanate, nickel(II) chloride and nickel(II) nitrate. Mixtures of various metal salts can also be employed.

Metal cyanide salts which are suitable for the preparation of the double metal cyanide compounds preferably have the general formula (VI)

$$(Y)_a M'(CN)_b (A)_c \quad (VI)$$

wherein
M' is chosen from one or more metal cations of the group consisting of Fe(II), Fe(III), Co(II), Co(III), Cr(II), Cr(III), Mn(II), Mn(III), Ir(III), Ni(II), Rh(III), Ru(II), V(IV) and V(V), preferably M' is one or more metal cations of the group consisting of Co(II), Co(III), Fe(II), Fe(III), Cr(III), Ir(III) and Ni(II),
Y is chosen from one or more metal cations of the group consisting of alkali metal (i.e. $Li^+$, $Na^+$, $K^+$, $Rb^+$, $Cs^+$) and alkaline earth metal (i.e. $Be^{2+}$, $Ca^{2+}$, $Mg^{2+}$, $Sr^{2+}$, $Ba^{2+}$),
A is chosen from one or more anions of the group consisting of halides (i.e. fluoride, chloride, bromide, iodide), hydroxide, sulfate, carbonate, cyanate, thiocyanate, isocyanate, isothiocyanate, carboxylate, oxalate or nitrate and
a, b and c are integers, wherein the values for a, b and c are chosen such that the metal cyanide salt has electroneutrality; a is preferably 1, 2, 3 or 4; b is preferably 4, 5 or 6; c preferably has the value 0.

Examples of suitable metal cyanide salts are potassium hexacyanocobaltate(III), potassium hexacyanoferrate(II), potassium hexacyanoferrate(III), calcium hexacyanocobaltate(III) and lithium hexacyanocobaltate(III).

Preferred double metal cyanide compounds which the DMC catalysts according to the invention contain are compounds of the general formula (VII)

$$M_x[M'_{x'}(CN)_y]_z \quad (VII),$$

wherein M is as defined in formula (II) to (V) and

M' is as defined in formula (VI), and
x, x', y and z are integers and are chosen such that the double metal cyanide compound has electroneutrality.
Preferably
x=3, x'=1, y=6 and z=2,
M=Zn(II), Fe(II), Co(II) or Ni(II) and
M'=Co(III), Fe(III), Cr(III) or Ir(III).

Examples of suitable double metal cyanide compounds are zinc hexacyanocobaltate(III), zinc hexacyanoiridate(III), zinc hexacyanoferrate(III) and cobalt(II) hexacyanocobaltate (III). Further examples of suitable double metal cyanide compounds are to be found e.g. in U.S. Pat. No. 5,158,922 (column 8, lines 29-66). Zinc cyanocobaltate(III) is particularly preferably used.

The organic complexing ligands added in the preparation of the DMC catalysts are disclosed, for example, in U.S. Pat. No. 5,158,922 (see in particular column 6, lines 9 to 65), U.S. Pat. Nos. 3,404,109, 3,829,505, 3,941,849, EP-A 700949, EP-A 761708, JP-A 4145123, U.S. Pat. No. 5,470,813, EP-A 743 093 and WO-A 97/40086. For example, water-soluble, organic compounds with hetero atoms, such as oxygen, nitrogen, phosphorus or sulfur, which can form complexes with the double metal cyanide compound are employed as organic complexing ligands. Preferred organic complexing ligands are alcohols, aldehydes, ketones, ethers, esters, amides, ureas, nitriles, sulfides and mixtures thereof. Particularly preferred organic complexing ligands are aliphatic ethers (such as dimethoxyethane), water-soluble aliphatic alcohols (such as ethanol, isopropanol, n-butanol, iso-butanol, sec-butanol, tert-butanol, 2-methyl-3-buten-2-ol and 2-methyl-3-butyn-2-ol), and compounds which contain both aliphatic or cycloaliphatic ether groups and aliphatic hydroxyl groups (such as e.g. ethylene glycol mono-tert-butyl ether, diethylene glycol mono-tert-butyl ether, tripropylene glycol monomethyl ether and 3-methyl-3-oxetane-methanol. Organic complexing ligands which are most preferred are chosen from one or more compounds of the group consisting of dimethoxyethane, tert-butanol, 2-methyl-3-buten-2-ol, 2-methyl-3-butyn-2-ol, ethylene glycol mono-tert-butyl ether and 3-methyl-3-oxetane-methanol.

One ore more complexing component(s) from the compound classes of polyethers, polyesters, polycarbonates, polyalkylene glycol sorbitan esters, polyalkylene glycol glycidyl ethers, polyacrylamide, poly(acrylamide-co-acrylic acid), polyacrylic acid, poly(acrylic acid-co-maleic acid), polyacrylonitrile, polyalkyl acrylates, polyalkyl methacrylates, polyvinyl methyl ether, polyvinyl ethyl ether, polyvinyl acetate, polyvinyl alcohol, poly-N-vinylpyrrolidone, poly(N-vinylpyrrolidone-co-acrylic acid), polyvinyl methyl ketone, poly(4-vinylphenol), poly(acrylic acid-co-styrene), oxazoline polymers, polyalkyleneimines, maleic acid and maleic anhydride copolymers, hydroxyethylcellulose and polyacetals, or of glycidyl ethers, glycosides, carboxylic acid esters of polyfunctional alcohols, bile acids or salts, esters or amides thereof, cyclodextrins, phosphorus compounds, α,β-unsaturated carboxylic acid esters or ionic surface- or interface-active compounds are optionally employed in the preparation of the DMC catalysts according to the invention.

Preferably, in the first step in the preparation of the DMC catalysts according to the invention, the aqueous solutions of the metal salt (e.g. zinc chloride), employed in a stoichiometric excess (at least 50 mol %), based on the metal cyanide salt (that is to say at least a molar ratio of cyanide-free metal salt to metal cyanide salt of 2.25 to 1.00), and of the metal cyanide salt (e.g. potassium hexacyanocobaltate) are reacted in the presence of the organic complexing ligand (e.g. tert-butanol), so that a suspension which contains the double metal cyanide compound (e.g. zinc hexacyanocobaltate), water, excess cyanide-free metal salt and the organic complexing ligand is formed. In this context, the organic complexing ligand can be present in the aqueous solution of the cyanide-free metal salt and/or of the metal cyanide salt, or it is added directly to the suspension obtained after precipitation of the double metal cyanide compound. It has proved to be advantageous to mix the aqueous solutions of the cyanide-free metal salt and of the metal cyanide salt and the organic complexing ligand with vigorous stirring. The suspension formed in the first step is then optionally treated with a further complexing component. In this context, the complexing component is preferably employed in a mixture with water and organic complexing ligand. A preferred method for carrying out the first step (i.e. the preparation of the suspension) is carried out employing a mixing nozzle, particularly preferably employing a jet disperser as described in WO-A 01/39883.

In the second step the solid (i.e. the precursor of the catalyst according to the invention) is isolated from the suspension by known techniques, such as centrifugation or filtration.

In a preferred embodiment variant for the preparation of the catalyst, in a third process step the solid which has been isolated is subsequently washed with an aqueous solution of the organic complexing ligand (e.g. by resuspending and subsequent renewed isolation by filtration or centrifugation). In this manner, for example, water-soluble by-products, such as potassium chloride, can be removed from the catalyst according to the invention. Preferably, the amount of organic complexing ligand in the aqueous wash solution is between 40 and 80 wt. %, based on the total solution.

In the third step, further complexing component is optionally added to the aqueous wash solution, preferably in the range of between 0.5 and 5 wt. %, based on the total solution.

It is moreover advantageous for the solid which has been isolated to be washed more than once. For this e.g. the first washing operation can be repeated. However, it is preferable to use non-aqueous solutions for further washing operations, e.g. a mixture of organic complexing ligand and further complexing component.

The solid which has been isolated and optionally washed is then dried, optionally after pulverization, at temperatures of in general 20-100° C. and under pressures of from in general 0.1 mbar to normal pressure (1013 mbar).

A preferred method for isolating the DMC catalysts according to the invention from the suspension by filtration, washing of the filter cake and drying is described in WO-A 01/80994.

In the process according to the invention, the DMC catalyst is used in amounts of from 10 to 1,000 ppm, preferably in amounts of from 15 to 500 ppm, particularly preferably in amounts of from 20 to 300 ppm and very particularly preferably in amounts of from 25 to 150 ppm, in each case based on the size of the total reaction batch.

Preferably, the DMC catalyst remains in the end product, but it can also be separated off, for example by treatment with adsorbents. Processes for separating off DMC catalysts are described, for example, in U.S. Pat. No. 4,987,271, DE-A 3132258, EP-A 406440, U.S. Pat. Nos. 5,391,722, 5,099,075, 4,721,818, 4,877,906 and EP-A 385619.

Alkylene oxides (epoxides) having 2 to 24 carbon atoms can be employed for the process according to the invention. The alkylene oxides having 2 to 24 carbon atoms are, for example, one or more compounds chosen from the group consisting of ethylene oxide, propylene oxide, 1-butene oxide, 2,3-butene oxide, 2-methyl-1,2-propene oxide (isobutene oxide), 1-pentene oxide, 2,3-pentene oxide, 2-methyl-1,2-butene oxide, 3-methyl-1,2-butene oxide, 1-hexene oxide, 2,3-hexene oxide, 3,4-hexene oxide, 2-methyl-1,2-pentene oxide, 4-methyl-1,2-pentene oxide, 2-ethyl-1,2-butene oxide, 1-heptene oxide, 1-octene oxide, 1-nonene oxide, 1-decene oxide, 1-undecene oxide, 1-dodecene oxide, 4-methyl-1,2-pentene oxide, butadiene monoxide, isoprene monoxide, cyclopentene oxide, cyclohexene oxide, cycloheptene oxide, cyclooctene oxide, styrene oxide, methylstyrene oxide, pinene oxide, mono- or polyepoxidized fats as mono-, di- and triglycerides, epoxidized fatty acids, $C_1$-$C_{24}$ esters of epoxidized fatty acids, epichlorohydrin, glycidol, and derivatives of glycidol, such as, for example, methyl glycidyl ether, ethyl glycidyl ether, 2-ethylhexyl glycidyl ether, allyl glycidyl ether, glycidyl methacrylate and epoxide-functional alkyloxysilanes, such as, for example, 3-glycidyloxypropyltrimethoxysilane, 3-glycidyloxypropyltriethoxysilane, 3-glycidyloxypropyltripropoxysilane, 3-glycidyloxypropylmethyldimethoxysilane, 3-glycidyloxypropylethyldiethoxysilane and 3-glycidyloxypropyltriisopropoxysilane.

Propylene oxide and/or ethylene oxide are preferably employed in the process according to the invention. Pure propylene oxide or a mixture of propylene oxide and ethylene oxide with up to 75 wt. % of ethylene oxide, based on the total weight of the alkylene oxides metered in, is particularly preferably employed. The alkylene oxides can be fed to the reactor as individual components or as a mixture. It is likewise possible to feed several alkylene oxides to the reactor in succession, by which means polyether chains with a block structure can be realized. If several alkylene oxides are metered in, the composition of the alkylene oxide stream fed in can be changed continuously or instantaneously.

Further monomers which can be copolymerized with alkylene oxides under DMC catalysis by the process according to the invention are, for example, lactones, lactides, acid anhydrides, cyclic carbonates and carbon dioxide. Their use is described in U.S. Pat. Nos. 3,538,043, 4,500,704, 5,032,671, 6,646,100, EP-A 222453 and WO-A 2008/013731.

Anti-ageing agents, such as e.g. antioxidants, can likewise be added to the end products.

In one embodiment, DMC catalyst is added to the H-functional starter compound and the mixture is introduced into a reactor, or the H-functional starter compound and the DMC catalyst are introduced into a reactor. Small amounts (1 to 500 ppm) of organic or inorganic acids can moreover additionally be added to the H-functional starter compound before the addition of the DMC catalyst, as described, for example, in WO-A 99/14258.

In a preferred procedure, the contents of the reactor are first stripped with inert gas (nitrogen or a noble gas, such as, for example, argon) at temperatures of from 60 to 160° C. preferably 100 to 155° C., very particularly preferably 110 to 155° C., over a period of from preferably 10 to 60 min, while stirring. During the stripping, volatile constituents are removed while passing inert gases into the liquid phase with a simultaneously applied vacuum under an absolute pressure of from 5 to 500 mbar. The temperature can then be adjusted to the reaction temperature of the following step, if this is not identical to the stripping temperature. However, the final reaction temperature can also first be established in the initial phase of the metering of alkylene oxide. The reaction temperature in the polymerization is, for example, 110-150° C., preferably 130-150° C. and particularly preferably 140-150° C. The present invention thus also provides a process for the preparation of polyether polyols with equivalent molecular weights of from 8,000 to 20,000 g/mol, preferably from 9,000 to 20,000 g/mol, particularly preferably from 10,000 to 16,000 g/mol, wherein (α) the DMC catalyst and one or more H-functional starter compounds are initially introduced into a reactor and, at a temperature of from 60 to 160° C., preferably 100 to 155° C., very particularly preferably from 110 to 155° C., inert gas (nitrogen or a noble gas, such as, for example, argon) is preferably passed into the mixture of DMC catalyst and one or more H-functional starter compounds and a reduced pressure (absolute) of from 5 mbar to 500 mbar, preferably from 40 mbar to 200 mbar, is simultaneously established in the reactor by removal of the inert gas ("stripping"), (β) one or more alkylene oxides are then metered into the reactor over a period of from 15 to 23 h ("polymerization"), for example at a temperature of 110-150° C., preferably 130-150° C. and particularly preferably 140-150° C.

In a particularly preferred procedure the DMC catalyst is first activated separately in a process step prior to the polymerization (see step β above) by metering in typically 2 to 20 wt. %, based on the sum of the one or more H-functional starter compounds employed in step (α). The addition of one or more alkylene oxides can take place before, during or after the heating of the contents of the reactor to the stripping or reaction temperature; it is preferably carried out after the stripping. After interruption of the metering of alkylene oxide, after typically 2 to 20 wt. % of alkylene oxide, based on the sum of the one or more H-functional starter compounds employed in step (α), has been metered in, the activation of the DMC catalyst manifests itself by an accelerated drop in the reactor pressure, whereby the start of the alkylene oxide conversion is indicated. The remaining amount of alkylene oxide or alkylene oxide mixture is then fed continuously to the reaction mixture over a period of from 15 to 23 h, a reaction temperature of from 110 to 150° C., preferably 130 to 150° C. and particularly preferably 140 to 150° C. being chosen. The present invention thus also provides a process for the preparation of polyether polyols with equivalent molecular weights of from 8,000 to 20,000 g/mol, preferably from 9,000 to 20,000 g/mol, particularly preferably from 10,000 to 16,000 g/mol, wherein (α) (α1) the DMC catalyst and one or more H-functional starter compounds are initially introduced into a reactor and, at a temperature of from 60 to 160° C., preferably 100 to 155° C., very particularly preferably from 110 to 155° C., inert gas (nitrogen or a noble gas, such as, for example, argon), is passed into the reactor, preferably into the mixture of DMC catalyst and one or more H-functional starter compounds, and a reduced pressure (absolute) of from 5 mbar to 500 mbar, preferably from 40 mbar to 200 mbar, is simultaneously established in the reactor by removal of the inert gas ("stripping"), (α2) a part amount of one or more alkylene oxides is added to the mixture from step (α1), preferably from 2 to 20 wt. % (based on the sum of the one or more H-functional starter compounds employed in step (α1)) ("activation"), (β) the remaining part amount of one or more alkylene oxides is then metered into the reactor over a period of from 15 to 23 h ("polymerization"), for example at a temperature of 110-150° C., preferably 130-150° C. and particularly preferably 140-150° C.

In all the embodiments described, the reaction temperature during the polymerization (step (β)) can be varied within the temperature limits described. One or more alkylene oxides can likewise be fed to the reactor in various ways. Metering into the gas phase or directly into the liquid phase, e.g. via an immersed tube, or a distributor ring located in a thoroughly mixed zone close to the reactor base, is possible. Metering into the liquid phase is the preferred variant. In the case of metering into the liquid phase, the metering systems should be self-emptying in configuration, for example by attachment of the metering bores to the under-side of the distributor ring. The alkylene oxides are fed continuously to the reactor such that the safety pressure limits of the reactor system used are not exceeded. In particular, in the case of metering of alkylene oxide mixtures containing ethylene oxide or pure ethylene oxide it is to be ensured that an adequate inert gas partial pressure is maintained in the reactor during the start-up and metering phase. This can be established, for example, by a noble gas (such as, for example, argon) or nitrogen. The metering rate of the alkylene oxides in the polymerization phase (step (β)) can be kept constant or alternatively changed stepwise or continuously. For example, the alkylene oxide metering rate in the polymerization phase (step (β)) can be between 4,500 g of alkylene oxide/(mol of hydroxyl groups×h) and 50 g of alkylene oxide/(mol of hydroxyl groups×h), preferably between 2,000 g of alkylene oxide/(mol of hydroxyl groups×h) and 50 g of alkylene oxide/(mol of hydroxyl groups×h), particularly preferably between 1,000 g of alkylene oxide/(mol of hydroxyl groups×h) and 70 g of alkylene oxide/(mol of hydroxyl groups×h) and very particularly preferably between 750 g of alkylene oxide/(mol of hydroxyl groups×h) and 100 g of alkylene oxide/(mol of hydroxyl groups×h), it being possible for the alkylene oxide metering rate to be kept constant or changed stepwise or continuously. The alkylene oxide metering rate can be both increased and lowered during a reaction batch. In a preferred embodiment of the invention, the alkylene oxide metering rate is lowered during a reaction batch.

A reverse flow of reaction medium into the metering systems can advantageously be prevented by apparatus measures, for example by installing nonreturn valves.

If several alkylene oxides are metered in during the polymerization step, the particular alkylene oxides can be fed to the reactor separately or as an alkylene oxide mixture. Mixing of the alkylene oxides can be achieved, for example, by a mixing system located in the common metering zone ("inline blending"). It has also proved appropriate to meter in the alkylene oxides individually or as a premix or mixture on the pump pressure side in a pumped circulation led, for example, over heat exchangers. For thorough mixing with the reaction medium, it is then advantageous to integrate a high-shear mixing system into the alkylene oxide/reaction medium stream. The temperature of the exothermic polymerization (alkylene oxide addition reaction) is kept at the desired level or adjusted to the desired level by cooling. According to the prior art for configuring polymerization reactors for exothermic reactions (e.g. Ullmann's Encyclopedia of Industrial Chemistry, vol. B4, pages 167 et seq., 5th ed., 1992), such a cooling is in general carried out via the reactor wall (e.g. double-walled jacket, half pipe coil jacket) and by means of further heat exchanger surfaces arranged internally in the reactor and/or externally in the pumped circulation, e.g. on cooling coils, cooling cartridges, plate, tube bundle or mixer heat exchangers. These should be configured such that cooling can also be carried out effectively at the start of the metering phase, i.e. at a low level of fill.

Generally, thorough mixing of the contents of the reactor should be ensured in all the reaction phases by configuration and use of commercially available stirring units, stirrers arranged in one or more stages or stirrer types acting over a large area over the filling height being particularly suitable here (see e.g. Handbuch Apparate; Vulkan-Verlag Essen, 1st ed. (1990), p. 188-208). A mixing energy which is introduced on average over the entire contents of the reactor and is in general in the range of from 0.2 to 5 W/l, with correspondingly higher local power inputs in the region of the stirring units themselves and where appropriate at lower filling levels, is particularly relevant industrially here. In order to achieve an optimum stirring action, according to the general state of the art combinations of baffles (e.g. flat or tubular baffles) and cooling coils (or cooling cartridges) can be arranged in the reactor, and can also extend over the container base. The stirring output of the mixing system can also be varied during the metering phase as a function of the filling level, in order to ensure a particularly high introduction of energy in critical reaction phases. For example, it may be advantageous for dispersions which contain solids and which may be present at the start of the reaction, for example if sucrose is used, to be mixed particularly intensively. Furthermore, especially if solid H-functional starter compounds are employed, it should be ensured by the choice of the stirring system that adequate dispersing of the solid in the reaction mixture is ensured. Stirring stages at the base and stirring units which are particularly suitable for suspending material are preferably employed here. The stirrer geometry should furthermore contribute towards reducing foaming of reaction products. Foaming of reaction mixtures may be observed, for example, after the end of the metering and after-reaction phase, when residual alkylene oxides are additionally removed in vacuo under absolute pressures in the range of from 1 to 500 mbar. Stirring units which achieve a continuous mixing of the surface of the liquid have proved to be suitable for such cases. Depending on the requirement, the stirrer shaft is base-mounted and optionally has further support mountings in the container. The stirrer shaft can be driven here from the top or bottom (with a central or eccentric arrangement of the shaft).

Alternatively, it is also possible to achieve the necessary mixing exclusively via a pumped circulation led to a heat exchanger or to operate this as a further mixing component in addition to the stirring system, the contents of the reactor being pumped in circulation as required (typically once to 50 times per hour).

The most diverse reactor types are suitable for carrying out the process according to the invention. Cylindrical containers which have a height/diameter ratio of from 1:1 to 10:1 are preferably employed. Possible reactor bases are, for example, spherical, dished, flat or conical bases.

The end of the metering of alkylene oxide can be followed by an after-reaction phase in which the decrease in the concentration of unreacted alkylene oxide can be quantified by monitoring the pressure. If appropriate, after the end of the after-reaction phase the reaction mixture can be freed quantitatively from small amounts of unreacted alkylene oxide, for example, in vacuo, under an absolute pressure of from 1 to 500 mbar, or by stripping. By stripping, volatile constituents, such as, for example, (residual) alkylene oxides, are removed while passing inert gases or steam into the liquid phase with a simultaneously applied vacuum (for example by passing inert gas through under an absolute pressure of from 5 to 500 mbar). The removal of volatile constituents, such as, for example, unreacted alkylene oxides, either in vacuo or by stripping, is in general carried out at temperatures of from 20 to 200° C., preferably at 50 to 160° C. and preferably at the reaction temperature, while stirring. Such stripping operations can also be carried out in so-called stripping columns, in which a stream of inert gas or steam is passed in countercurrent to the product stream. When a constant pressure is reached or when volatile constituents have been removed by vacuum and/or stripping, the product can be discharged from the reactor.

It is known in general that DMC catalysts are sensitive to polar impurities of the reaction mixture, in particular the H-functional starter compound(s). The DMC catalysts then cannot be converted or at least can be converted less effectively into the polymerization-active form during the reaction initiation phase. Impurities can be, for example, water or compounds with basic groups, such as, for example, amines Substances with carbonyl groups in the near vicinity or carbonyl groups adjacent to hydroxyl groups also have an adverse effect on the catalyst activity. In order to be able nevertheless to subject starters with impurities which are to be regarded as catalyst poisons to DMC-catalysed alkylene oxide addition reactions, it is advantageous to keep the stationary concentration of catalyst poisons as low as possible. This can be achieved by a process with a continuous metering of the H-functional starter compound(s). In this, for example, not the complete amount of H-functional starter compounds is initially introduced into the reactor, but only a part, for example 0.1 to 20 wt. %, of the total amount of H-functional starter compound employed, and the remaining amount of H-functional starter compound is fed continuously to the reactor together with the alkylene oxides during the reaction (step ($\beta$)). The H-functional starter compound initially introduced into the reactor is also called the starting medium. An H-functional starter compound which is the same as or different from the H-functional starter compound employed in step ($\beta$) can be employed as the starting medium. One or more components chosen from the group consisting of polyether polyols, polycarbonate polyols, polyester carbonate polyols, polyether carbonate polyols, in each case, for example, with equivalent molecular weights in the range of from 56 to 20,000 g/mol, are preferred as the starting medium. Polyether polyols with equivalent molecular weights of from 4,000 to 20,000 g/mol, for example a polyether polyol prepared by the process according to the invention, which has been prepared, for example, in a preceding batch, are particularly preferably employed as the starting medium.

In the preparation of polyether polyols with the equivalent molecular weights according to the invention, it has been found that in the case where H-functional starter compounds with equivalent molecular weights of less than 200 g/mol are used it is expedient to keep the starter metering rate exactly equal to or less than 2.5% of the alkylene oxide metering rate. This has the advantage that the resulting products can be prepared with a constant quality, in particular with a constantly low viscosity. For this, preferably, the metering of the H-functional starter compound(s) with an equivalent molecular weight of less than 200 g/mol is preferably carried out as a solution in an inert solvent or as a mixture with a further H-functional starter compound with an equivalent molecular weight of greater than 300 g/mol.

In a further embodiment of the process according to the invention for the preparation of high molecular weight polyether polyols with equivalent molecular weights in the range of from 8,000 to 20,000 g/mol, preferably from 9,000 to 20,000 g/mol, particularly preferably from 10,000 to 16,000 g/mol, a starting medium and DMC catalyst are initially introduced into the reactor system, the DMC catalyst is optionally activated as described above (step $\alpha2$), and the H-functional starter compound(s) is or are fed in continuously together with one or more alkylene oxides within a period of from 15 to 23 h. Since possibly very small amounts of H-functional starter compound must be metered in, it may prove to be advantageous for the H-functional starter compound(s) to be fed in as a solution in an inert solvent or as a mixture with a further H-functional starter compound with an equivalent molecular weight of greater than 300 g/mol. According to the invention, the metering time for the amount of one or more alkylene oxide(s) added in the polymerization step is 15 to 23 hours. Alkylene oxide addition products, such as, for example, polyether polyols, polycarbonate polyols, polyester carbonate polyols, polyether carbonate polyols, in each case, for example, with equivalent molecular weights in the range of from 56 to 20,000 g/mol, preferably from 190 to 20,000 g/mol, a part amount of the H-functional starter compound, and/or polyether polyol with an equivalent molecular weight of from 4,000 to 40,000 g/mol, for example a polyether polyol prepared by the process according to the invention, which has been prepared, for example, in a preceding batch, are suitable as the starting medium. Preferably, a part amount of H-functional starter compound or polyether polyol with an equivalent molecular weight of from 8,000 to 20,000 g/mol which has been prepared by the process according to the invention, for example, in a preceding batch, is employed as the starting medium. A polyether polyol with an equivalent molecular weight of from 8,000 to 20,000 g/mol prepared by the process according to the invention, which has been prepared in a preceding batch, is particularly preferably used as the starting medium.

The present invention also provides a process for the preparation of polyether polyols with equivalent molecular weights of from 8,000 to 20,000 g/mol, preferably from 9,000 to 20,000 g/mol, particularly preferably from 10,000 to 16,000 g/mol, wherein ($\alpha$) ($\alpha$1) the DMC catalyst and a starting medium are initially introduced into a reactor and, at a temperature of from 60 to 160° C., preferably 100 to 155° C., very particularly preferably from 110 to 155° C., inert gas (nitrogen or a noble gas, such as, for example, argon), is optionally passed into the reactor, preferably into the mixture of DMC catalyst and starting medium, and a reduced pressure (absolute) of from 5 mbar to 500 mbar, preferably from 40 mbar to 200 mbar, is simultaneously established in the reactor by removal of the inert gas ("stripping"), ($\alpha$2) a part amount of one or more alkylene oxides is optionally added to the mixture from step (a1), preferably from 2 to 20 wt. % (based on the amount of starting medium initially introduced in step ($\alpha$1)) ("activation"), ($\beta$) the total amount or the remaining part amount of one or more alkylene oxides and the H-functional starter compound (or a part amount of the H-functional starter compound) are then metered into the reactor and the one or more alkylene oxides are fed in here over a period of from 15 to 23 h ("polymerization"), for example at a temperature of 110-150° C., preferably 130-150° C. and particularly preferably 140-150° C., wherein alkylene oxide addition products (such as, for example, polyether polyol, polycarbonate polyol, polyester carbonate polyol, polyether carbonate polyol, in each case, for example, with an equivalent molecular weight in the range of from 56 to 20,000 g/mol, preferably from 190 to 20,000 g/mol), a part amount of the H-functional starter compound and/or polyether polyol with an equivalent molecular weight of from 4,000 to 20,000 g/mol, for example a polyether polyol prepared by the process according to the invention, which has been prepared, for example, in a preceding batch, are employed as the starting medium.

In an alternative embodiment of the invention, the metering of the H-functional starter compound ends before the metering of the alkylene oxides extending over a period of from 15 to 23 h is ended. This has the advantage that a complete conversion of the H-functional starter compound with the alkylene oxide(s) is achieved. In the context of the invention, "concluding phase of the polymerization step" is understood as meaning the period of time from the end of the metering of the H-functional starter compound(s) to the end of the metering of the alkylene oxides. In this alternative embodiment, the metering rate of the alkylene oxides can be changed stepwise or continuously in the concluding phase of the polymerization step after the end of the metering of the H-functional starter compound(s). For example, the alkylene oxide metering rate can be varied between 4,500 g of alkylene oxide/(mol of hydroxyl groups×h) and 50 g of alkylene oxide/(mol of hydroxyl groups×h), preferably between 2,000 g of alkylene oxide/(mol of hydroxyl groups×h) and 50 g of alkylene oxide/(mol of hydroxyl groups×h), particularly preferably between 1,000 g of alkylene oxide/(mol of hydroxyl groups×h) and 70 g of alkylene oxide/(mol of hydroxyl groups×h) and very particularly preferably between 750 g of alkylene oxide/(mol of hydroxyl groups×h) and 100 g of alkylene oxide/(mol of hydroxyl groups×h), the parameter "mol of hydroxyl groups" relating to the substance amount of hydroxyl groups present in the reaction mixture at the time of the end of the metering of the H-functional starter compound(s). The alkylene oxide metering rate can be both increased and lowered during the concluding phase of the polymerization step. In a preferred embodiment of the invention, the alkylene oxide metering rate is lowered during the concluding phase of the polymerization step. Alternatively, the alkylene oxide can also be changed after the end of the metering of the H-functional starter compound, whereby polyether polyols with multi-block structures can be prepared by this procedure. It is also possible to end the metering of the H-functional starter compound and the alkylene oxide metering simultaneously. It is likewise possible to vary the ratio of the metering rates of the one or more H-functional starter compounds and the one or more alkylene oxides during the common metering of the H-functional starter compound(s) and the alkylene oxide(s). Preferably, the ratio of the alkylene oxide metering rate ($M_A$)/metering rate of the H-functional starter compound ($M_H$) fulfils the following inequality in all phases of the common metering phase:

$$(M_H \times \text{OH number}_{H\text{-}functional\ starter\ compound})/(M_H+M_A) \geq \text{OH number}_{end\ product} \quad \text{(VIII)}$$

After the reagents have been metered in, an after-reaction phase can follow, in which the consumption of alkylene oxide in general can be quantified by monitoring the pressure. When a constant pressure is reached, the product can be discharged, optionally as described above after applying a vacuum or by stripping to remove unreacted alkylene oxides.

In a further embodiment of the process according to the invention, the reaction product is removed from the reactor continuously. In this procedure, a starting medium and a part amount of DMC catalyst are initially introduced into the reactor system and one or more H-functional starter compounds with equivalent molecular weights of between preferably 18 and 2,000 g/mol, particularly preferably from 56 to 1,200 g/mol, are fed to the reactor system continuously together with one or more alkylene oxides and DMC catalyst. The reaction product is removed from the reactor system continuously after an average dwell time of from 15 to 23 hours. Preferably, it is removed from the section of the reactor system into which one or more alkylene oxides are also metered. H-functional starter compounds with an equivalent molecular weight of from 150 to 2,000 g/mol are suitable, for example, as the starting medium of this completely continuous polyether polyol preparation process. Alkylene oxide addition products (such as, for example, polyether polyols) and/or a polyether polyol prepared by the process according to the invention, which has been prepared, for example, in a preceding production campaign, are suitable in particular as the starting medium. Preferably, a polyether polyol prepared by the process according to the invention, which has been prepared, for example, in a preceding production campaign, is employed as the starting medium. In a procedure which is likewise preferred, a part amount of H-functional starter compound with an equivalent molecular weight of from 150 to 2,000 g/mol and a part amount of DMC catalyst are initially introduced into the reactor system and the remaining part amount of the one or more H-functional starter compounds with an equivalent molecular weight of from 150 to 2,000 g/mol are fed to the reactor system continuously together with one or more alkylene oxides and DMC catalyst, the reaction product being removed from the reactor system continuously after an average dwell time of from 15 to 23 hours, and the removal of the reaction product preferably taking place from the section of the reactor system into which one or more alkylene oxides are also metered. The present invention thus also provides a process for the preparation of polyether polyols with equivalent molecular weights of from 8,000 to 20,000 g/mol, preferably from 9,000 to 20,000 g/mol, particularly preferably from 10,000 to 16,000 g/mol, wherein (α) (α1) a starting medium and a part amount of DMC catalyst are initially introduced into a reactor system and optionally (α2) a part amount of one or more alkylene oxides is added to the mixture from step (α1) ("activation")

(β) one or more H-functional starter compounds are metered in continuously together with alkylene oxide and further DMC catalyst and the reaction product is removed from the reactor system continuously after an average dwell time of from 15 to 23 hours.

wherein alkylene oxide addition products (such as, for example, polyether polyol, polycarbonate polyol, polyester carbonate polyol, polyether carbonate polyol, in each case, for example, with an equivalent molecular weight in the range of from 56 to 20,000 g/mol, preferably from 190 to 20,000 g/mol), a part amount of the H-functional starter compound and/or polyether polyol with an equivalent molecular weight of from 4,000 to 20,000 g/mol, for example a polyether polyol prepared by the process according to the invention, which has been prepared, for example, in a preceding batch, are employed as the starting medium.

This completely continuous procedure described above can be followed by continuous after-reaction steps, for example in a reactor cascade or in a tube reactor. Volatile constituents can be removed in vacuo and/or by stripping, as described above. The various process variants in the preparation of polyether polyols by the alkylene oxide addition process under DMC catalysis are described, for example, in WO-A 97/29146 and WO-A 98/03571.

The polyether polyols prepared by the process according to the invention can be reacted, by themselves or optionally in a mixture with further isocyanate-reactive components, with organic polyisocyanates, optionally in the presence of blowing agents, in the presence of catalysts and optionally with further additives, such as e.g. cell stabilizers, and in this way serve as components of solid or foamed polyurethanes, in particular flexible polyurethane foam, such as, for example, flexible polyurethane slabstock foam and flexible polyurethane moulded foam. The polyether polyols prepared by the process according to the invention can also be used, for example, as components for adhesive and sealant materials, and in particular serve as precursor polyols for the preparation of silane-terminated polyethers, which in their turn can be employed in moisture-curing sealant systems.

The invention likewise provides polyurethanes, preferably solid or foamed polyurethanes, in particular flexible polyurethane foams, such as, for example, flexible polyurethane slabstock foams and flexible polyurethane moulded foams, containing the polyether polyols prepared by the process according to the invention.

The OH numbers were determined as specified in DIN 53240. The viscosities were determined by means of a rotary viscometer (Physica MCR 51, manufacturer: Anton Paar) as specified in DIN 53018.

The molecular weight distribution was determined by means of size exclusion chromatography (SEC). The apparatus Agilent 1100 Series from Agilent was used. The polydispersity PD for the molecular weight distribution $M_w/M_n$, wherein $M_w$ represents the weight-average molecular weight and $M_n$ represents the number-average molecular weight, is stated. Further information on this analysis:

Column combination: 1 pre-column PSS, 5 µl, 8×50 mm; 2 PSS SVD, 5 µl, 100 A°, 8×300 mm; 2 PSS SVD, 5 µl, 1,000 A°, 8×300 mm, PSS is the manufacturer of the columns (Polymer Standard Solutions, Mainz)

Evaluation software: WIN GPC from PSS

Solvent: THF (Merck LiChrosolv)

Flow rate: 1 ml/min

Detector type: RI detector (refractive index), Shodex RI 74

Calibration standards used: calibration standard from PSS based on polystyrene.

Raw Materials Employed

Catalyst for the alkylene oxide addition (DMC catalyst):

Double metal cyanide catalyst containing zinc hexacyanocobaltate, tert-butanol and polypropylene glycol with a number-average molecular weight of 1,000 g/mol; described in WO-A 01/80994, Example 6.

ACCLAIM® Polyol 2200N:

Polypropylene glycol with a molecular weight of 2,000 g/mol, prepared via DMC catalysis (30 ppm of DMC catalyst), obtainable from Bayer MaterialScience AG.

IRGANOX® 1076:

Octadecyl 3-(3,5-di-tert-butyl-4-hydroxyphenyl)propionate. (BASF SE))

EXAMPLE 1 and COMPARISON EXAMPLES 2 and 3

471.4 g of ACCLAIM® Polyol 2200N were introduced into a 10 l laboratory autoclave under a nitrogen atmosphere. After addition of 0.487 g of DMC catalyst, the contents of the autoclave were stripped at 130° C. while stirring (grid stirrer) at 350 rpm in vacuo under an absolute pressure of from 100 to 120 mbar, while passing in 50 ml of nitrogen per minute via a distributor ring lying under the level of the liquid. A total of 5,528.7 g of propylene oxide were then metered in via this distributor ring, initially likewise at 130° C. while stirring at 350 rpm, with a constant metering rate and a stirrer speed of 350 rpm for the period of time stated in Table 1. After 50 g of propylene oxide had been metered in, the reaction temperature was raised to 145° C. in the course of 7 min and kept at this temperature until the end of the metering of propylene oxide. After an after-reaction time of 21 min, the mixture was heated thoroughly at the reaction temperature under an absolute pressure of 1 mbar for 0.5 h and thereafter cooled to 80° C., and 3.0 g of IRGANOX® 1076 were added. The physical properties and further reaction parameters are shown in Table 1.

TABLE 1

| Example | Propylene oxide metering time [h] | OH number [mg of KOH/g] | Viscosity at 25° C. [mPas] | Calculated expected viscosity values η [mPas][*] | Polydispersity |
|---|---|---|---|---|---|
| 1 | 18 | 4.8 | 37,900 ($\eta_1$) | — | 1.09 |
| 2 (comparison) | 14 | 5.0 | 39,000 | $\eta_2$ = 32,990 | 1.09 |
| 3 (comparison) | 6 | 4.8 | 42,190 | $\eta_3$ = 37,900 | 1.15 |

[*]: In this column, the expected values of the viscosities $\eta_2$ and $\eta_3$ for the comparison polyols 2 and 3 were calculated from the viscosity ($\eta_1$) measured for Example 1 according to the invention by the relationship according to equation IX which is valid for such long-chain polypropylene glycols (D. Zhu, M. A. Haidekker, J.-S. Lee, Y.-Y. Won, J. C.-M. Lee, Macromolecules 2007, 40, 7730-7732). The influence of the molecular weight on the viscosities can be calculated from this and the advantages of the procedure according to the invention emerge still more clearly: $\eta_{(2\,or\,3)} = \eta_1 \times (M_{(2\,or\,3)}/M_1)^{3.4}$ (IX) wherein $M_1$, $M_2$ and $M_3$ denotes the particular equivalent molecular weight of the polypropylene glycol from Example 1 or Comparison Example 2 or 3 respectively.

EXAMPLE 4 and COMPARISON EXAMPLE 5

471.4 g of ACCLAIM® Polyol 2200N were introduced into a 10 l laboratory autoclave under a nitrogen atmosphere. After addition of 0.487 g of DMC catalyst, the contents of the autoclave were stripped at 130° C. while stirring (grid stirrer) at 350 rpm in vacuo under an absolute pressure of from 100 to 120 mbar, while passing in 50 ml of nitrogen per minute via a distributor ring lying under the level of the liquid. A total of 5,528.7 g of propylene oxide were then metered in via this distributor ring, initially likewise at 130° C. while stirring at 350 rpm, with a constant metering rate and a stirrer speed of 350 rpm for the period of time stated in Table 1. After 50 g of propylene oxide had been metered in, the reaction temperature was raised to 135° C. in the course of 7 min and kept at this temperature until the end of the metering of propylene oxide. After an after-reaction time of 21 min, the mixture was heated thoroughly at the reaction temperature under an absolute pressure of 1 mbar for 0.5 h and thereafter cooled to 80° C., and 3.0 g of IRGANOX® 1076 were added. The physical properties and further reaction parameters are shown in Table 2.

TABLE 2

| Example | Propylene oxide metering time [h] | OH number [mg of KOH/g] | Viscosity at 25° C. [mPas] | Calculated expected viscosity values η [mPas][*] | Polydispersity |
|---|---|---|---|---|---|
| 4 | 18 | 4.8 | 40,050 ($\eta_4$) | — | 1.09 |
| 5 (comparison) | 14 | 4.9 | 41,200 | $\eta_5$ = 37,340 | 1.09 |

[*]: In this column, the expected value of the viscosity $\eta_5$ for the comparison polyol 5 was calculated from the viscosity ($\eta_4$) measured for Example 4 according to the invention by the relationship according to equation X which is valid for such long-chain polypropylene glycols (D. Zhu, M. A. Haidekker, J.-S. Lee, Y.-Y. Won, J. C.-M. Lee, Macromolecules 2007, 40, 7730-7732). The influence of the molecular weight on the viscosity can be calculated from this and the advantages of the procedure according to the invention emerge still more clearly: $\eta_5 = \eta_4 \times (M_5/M_4)^{3.4}$ (X) wherein $M_4$ and $M_5$ denotes the particular equivalent molecular weight of the polypropylene glycol from Example 4 or Comparison Example 5 respectively.

EXAMPLE 6

471.4 g of ACCLAIM® Polyol 2200N were introduced into a 10 l laboratory autoclave under a nitrogen atmosphere. After addition of 0.480 g of DMC catalyst, the contents of the autoclave were stripped at 130° C. while stirring (grid stirrer) at 350 rpm in vacuo under an absolute pressure of from 100 to 120 mbar, while passing in 50 ml of nitrogen per minute via a distributor ring lying under the level of the liquid. A total of 5,528.6 g of propylene oxide were then metered in via this distributor ring in the course of 18.25 hours, initially likewise at 130° C. while stirring at 350 rpm. After 50 g of propylene oxide had been metered in, the reaction temperature was raised to 145° C. in the course of 10 min and kept at this temperature until the end of the metering of propylene oxide.

The propylene oxide was fed to the autoclave in accordance with the following metering gradient:

0 to 2,462 g of propylene oxide: 352 g of propylene oxide per hour, 2,462 to 4,028 g of propylene oxide: A linear lowering of the metering rate from 352 g of propylene oxide per hour to 315 g of propylene oxide per hour takes place as a function of the metered weight of propylene oxide, 4,028 to 5,200 g of propylene oxide: A linear lowering of the metering rate from 315 g of propylene oxide per hour to 220 g of propylene oxide per hour takes place as a function of the metered weight of propylene oxide, 5,200 to 5,500 g of propylene oxide: A linear lowering of the metering rate from 220 g of propylene oxide per hour to 130 g of propylene oxide per hour takes place as a function of the metered weight of propylene oxide, 5,500 to 5,528.6 g of propylene oxide: A linear lowering of the metering rate from 130 g of propylene oxide per hour to 100 g of propylene oxide per hour takes place as a function of the metered weight of propylene oxide.

After an after-reaction time of 26 min, the mixture was heated thoroughly at the reaction temperature under an absolute pressure of 1 mbar for 0.5 h and thereafter cooled to 80° C., and 3.021 g of IRGANOX® 1076 were added. The physical properties are shown in Table 3.

COMPARISON EXAMPLE 7

471.5 g of ACCLAIM® Polyol 2200N were introduced into a 10 l laboratory autoclave under a nitrogen atmosphere. After addition of 0.486 g of DMC catalyst, the contents of the autoclave were stripped at 130° C. while stirring (grid stirrer) at 350 rpm in vacuo under an absolute pressure of from 100 to 120 mbar, while passing in 50 ml of nitrogen per minute via a distributor ring lying under the level of the liquid. A total of 5,528.7 g of propylene oxide were then metered in via this distributor ring in the course of 23.5 hours, initially likewise at 130° C. while stirring at 350 rpm. After 55 g of propylene oxide had been metered in, the reaction temperature was raised to 145° C. in the course of 14 min and kept at this temperature until the end of the metering of propylene oxide.

The propylene oxide was fed to the autoclave in accordance with the following metering gradient:

0 to 2,462 g of propylene oxide: A lowering of the metering rate from 352 g of propylene oxide per hour to 315 g of propylene oxide per hour takes place as a function of the metered weight of propylene oxide, 2,462 to 4,028 g of propylene oxide: A lowering of the metering rate from 315 g of propylene oxide per hour to 220 g of propylene oxide per hour takes place as a function of the metered weight of propylene oxide, 4,028 to 5,200 g of propylene oxide: A lowering of the metering rate from 220 g of propylene oxide per hour to 130 g of propylene oxide per hour takes place as a function of the metered weight of propylene oxide, 5,200 to 5,528.7 g of propylene oxide: A lowering of the metering rate from 130 g of propylene oxide per hour to 100 g of propylene oxide per hour takes place as a function of the metered weight of propylene oxide.

After an after-reaction time of 26 min, the mixture was heated thoroughly at the reaction temperature under an absolute pressure of 1 mbar for 0.5 h and thereafter cooled to 80°

C., and 3.021 g of IRGANOX® 1076 were added. The physical properties are shown in Table 3.

TABLE 3

| Example | OH number [mg of KOH/g] | Viscosity η at 25° C. [mPas] | Polydispersity |
|---|---|---|---|
| 6 | 5.0 | 35,950 | 1.09 |
| 7 (comparison) | 5.0 | 42,750 | 1.13 |

The invention claimed is:

1. A process for preparing a polyether polyol with equivalent molecular weights of from 8,000 to 20,000 g/mol from at least one H-functional starter compound and at least one alkylene oxide in the presence of a double metal cyanide (DMC) catalyst, comprising metering said alkylene oxide into a reactor in a course of from 15 to 23 h and wherein, for calculating the equivalent molecular weight: Equivalent molecular weight=56,100/ (OH number [mg of KOH/g]).

2. The process according to claim 1, wherein:
(α) the DMC catalyst and at least one H-functional starter compound is initially introduced into a reactor and inert gas is passed in at a temperature of from 60 to 160° C., and a reduced pressure (absolute) of from 5 mbar to 500 mbar is simultaneously established in the reactor by removing the inert gas to accomplish stripping,
(β) at least one alkylene oxide is then metered into the reactor over a period of from 15 to 23 h to accomplish polymerization.

3. The process according to claim 1 wherein:
(α) (α1) the DMC catalyst and at least one H-functional starter compound is initially introduced into a reactor and inert gas is passed in at a temperature of from 60 to 160° C., and a reduced pressure (absolute) of from 5 mbar to 500 mbar is simultaneously established in the reactor by removal of the inert gas to accomplish stripping,
(α2) a part amount of at least one alkylene oxide is added to a mixture from (α1) to accomplish activation,
(β) a remaining part amount of at least one alkylene oxide is then metered into the reactor over a period of from 15 to 23 h to accomplish polymerization.

4. The process according to claim 1, wherein:
(α) the DMC catalyst and a starting medium are initially introduced into a reactor,
(β) a total amount of at least one alkylene oxide, over a period of from 15 to 23 h, and the H-functional starter compound and/or a part amount of the H-functional starter compound are then metered into the reactor to accomplish polymerization,
wherein one or more alkylene oxide addition products, a part amount of the H-functional starter compound and/or a polyether polyol with an equivalent molecular weight of from 4,000 to 20,000 g/mol are employed as the starting medium.

5. The process according to claim 1, wherein:
(α) (α1) the DMC catalyst and a starting medium are initially introduced into a reactor,
(α2) a part amount of at least one alkylene oxide is added to a mixture from (α1) to accomplish activation,
(β) a remaining part amount of at least one alkylene oxide, over a period of from 15 to 23 h, and the H-functional starter compound and/or a part amount of the H-functional starter compound are then metered into the reactor to accomplish polymerization,
wherein one or more alkylene oxide addition products, a part amount of the H-functional starter compound and/or a polyether polyol with an equivalent molecular weight of from 4,000 to 20,000 g/mol are employed as the starting medium.

6. The process according to claim 5, wherein:
(α1) the DMC catalyst and at least one H-functional starter compound are initially introduced into a reactor and inert gas is passed in at a temperature of from 60 to 160° C., and a reduced pressure (absolute) of from 5 mbar to 500 mbar is simultaneously established in the reactor by removal of the inert gas to accomplish stripping.

7. The process according to claim 1, wherein:
(α) a starting medium and a part amount of DMC catalyst are initially introduced into a reactor system and
(β) at least one H-functional starter compound is metered in continuously together with alkylene oxide and further DMC catalyst and the reaction product is removed from the reactor system continuously after an average dwell time of from 15 to 23 hours,
wherein one or more alkylene oxide addition products, a part amount of the H-functional starter compound and/or a polyether polyol with an equivalent molecular weight of from 4,000 to 20,000 g/mol are employed as the starting medium.

8. The process according to claim 3, wherein in (α2), from 2 to 20 wt. % (based on the sum of the at least one H-functional starter compound employed in (α1)), of at least one alkylene oxide is added and in step (β), a remaining part amount of at least one alkylene oxide is added.

9. The process according to claim 2, wherein an alkylene oxide metering rate in (β) is from 4,500 g of alkylene oxide/mol of hydroxyl groups×h to 50 g of alkylene oxide/mol of hydroxyl groups×h.

10. The process according to claim 9, wherein the alkylene oxide metering rate is lowered in (β).

11. The process according to claim 1, wherein polymerization is carried out at a temperature of from 110-150° C.

12. The process according to claim 1, for preparing a polyether polyol with an equivalent molecular weight of from 9,000 to 20,000 g/mol.

13. The process according to claim 4, wherein in (β), metering of the H-functional starter compound is ended before metering of the alkylene oxide extending over a period of from 15 to 23 h is ended.

14. The process according to claim 13, wherein after end of metering of the H-functional starter compound, a metering rate of the alkylene oxide is changed, the alkylene oxide metering rate being from 4,500 g of alkylene oxide/mol of hydroxyl groups×h to 50 g of alkylene oxide/mol of hydroxyl groups×h.

15. The process according to claim 13, wherein after end of metering of the H-functional starter compound, the metering rate of the alkylene oxide is lowered.

16. The process according to claim 5, wherein in (α2), from 2 to 20 wt. % based on the sum of the at least one H-functional starter compound employed in (α1), of at least one alkylene oxide is added and in (β), a remaining part amount of at least one alkylene oxide is added.

17. The process according to claim 6, wherein in (α2), from 2 to 20 wt. % based on the sum of the at least one H-functional starter compound employed in (α1), of at least one alkylene oxide is added and in (β), a remaining part amount of at least one alkylene oxide is added.

18. The process according to claim 3, wherein an alkylene oxide metering rate in (β) is from 4,500 g of alkylene oxide/mol of hydroxyl groups×h to 50 g of alkylene oxide/mol of hydroxyl groups×h.

19. The process according to claim 8, wherein the alkylene oxide metering rate in (β) is from 4,500 g of alkylene oxide/mol of hydroxyl groups×h to 50 g of alkylene oxide/mol of hydroxyl groups×h.

20. The process according to claim 1, further comprising reacting the polyether polyol and an organic polyisocyanate to form a polyurethane.

\* \* \* \* \*